United States Patent [19]

Justice

[11] 4,245,178
[45] Jan. 13, 1981

[54] HIGH-FREQUENCY ELECTRODELESS DISCHARGE DEVICE ENERGIZED BY COMPACT RF OSCILLATOR OPERATING IN CLASS E MODE

[75] Inventor: James W. H. Justice, Murrysville, Pa.

[73] Assignee: Westinghouse Electric Corp., Pittsburgh, Pa.

[21] Appl. No.: 13,703

[22] Filed: Feb. 21, 1979

[51] Int. Cl.³ .................. H05B 41/16; H05B 41/24
[52] U.S. Cl. .................. 315/248; 315/267; 315/344; 331/117 R
[58] Field of Search .............. 315/248, 344, 267, 39; 331/117 R

[56] References Cited

U.S. PATENT DOCUMENTS

| 3,196,312 | 7/1965 | Marrison | 315/248 X |
| 3,596,207 | 7/1971 | Nabeyama | 331/117 R |
| 3,753,075 | 8/1973 | Tomura et al. | 331/117 R |
| 4,003,000 | 1/1977 | Sordello et al. | 331/117 R |
| 4,010,400 | 3/1977 | Hollister | 315/248 |
| 4,048,541 | 9/1977 | Adams et al. | 315/248 |
| 4,070,603 | 1/1978 | Regan et al. | 315/248 |
| 4,146,850 | 3/1979 | Fache et al. | 331/117 R |

Primary Examiner—Saxfield Chatmon, Jr.
Attorney, Agent, or Firm—W. D. Palmer

[57] ABSTRACT

High-frequency electrodeless discharge device is operated by radio-frequency energy generated by an oscillator operating in Class E mode. By proper selection of the oscillator circuit components, a load-network capacitor can be eliminated along with an inductor which is normally required to pass direct current to the transistor switch portion of the oscillator. The elimination of these elements permits the oscillator to be packaged in compact fashion. The discharge device incorporates a looped core of high permeability material which forms a part of the tuned circuit output portion of the oscillator and the radio frequency energy electromagnetic fields passed through and about the core and within the envelope of the device excite a discharge-sustaining medium to generate plasma which is converted to visible radiations. A feed-back signal winding is also wrapped about the looped core and electrically connects to the transistor switch portion of the oscillator in order to provide feedback oscillatory energy for the Class E oscillator.

7 Claims, 9 Drawing Figures

HIGH-FREQUENCY ELECTRODELESS DISCHARGE DEVICE ENERGIZED BY COMPACT RF OSCILLATOR OPERATING IN CLASS E MODE

BACKGROUND OF THE INVENTION

This invention generally relates to high frequency electrodeless lamps and, more particularly, to such a lamp which is particularly adapted to be operated by a very efficient and compact radio fequency oscillator operating in Class E mode.

High frequency electrodeless (HFE) lamps have received considerable attention in recent years as a possible replacement for the standard household incandescent lamps which convert electricity into light in a relatively inefficient manner. Fluorescent lamps are efficient converters of electricity into light, but their cumbersome size and need for ballasting has limited their application in the household. HFE lamps, in contrast to the standard fluorescent lamps, can be fabricated in a relatively compact size.

Copending application Ser. No. 883,544, filed Mar. 6, 1978 by J. W. H. Justice, the present applicant, and M. D. Nahemow, and owned by the present assignee, discloses a magnetic core for an HFE lamp which includes a gap of non-magnetic material in order to stabilize the radio frequency at which the device operates and to suppress harmonics of the operating frequency. The self-oscillatory circuits used to energize the lamp operate in a Class A, B, or C mode, with Class B or C being preferred.

U.S. Pat. No. 4,017,764, dated Apr. 12, 1977 to Anderson, discloses an HFE lamp of the fluorescent type wherein a ferrite core is entirely contained within a phosphor-coated envelope.

U.S. Pat. No. 4,010,400, dated Mar. 1, 1977 to Hollister, discloses an HFE lamp which utilizes a ferrite core as a part of a tuned circuit output for a radio frequency energizing source.

U.S. Pat. No. 4,005,330, dated Jan. 25, 1977 to Glascock et al. discloses an HFE lamp which utilizes a ferrite core which is positioned exteriorly of the sealed lamp envelope but with the core operatively positioned in energy transferring relationship with respect to the sealed envelope.

U.S. Pat. No. 3,987,335, dated Oct. 19, 1976 to Anderson discloses an HFE lamp of the fluorescent type wherein a ferrite core is only partially contained within the phosphor coated envelope.

The IEEE Journal of Solid-State Circuits, Volume SC-10, No. 3, June 1975, pages 168–176, Article by Sokal et al., entitled, "Class E—A New Class of High-Efficiency Tuned Single Ended Switching Power Amplifiers", considers the design parameters for Class E oscillators. A similar discussion is set forth in "Electronics Design" 20, Sept. 27, 1977.

SUMMARY OF THE INVENTION

The present improved oscillator is provided in combination with an electrodeless discharge device which is designed to operate with a rated power consumption when energized with a predetermined radio frequency energy as generated by a radio frequency power source. The radio frequency power source has an output portion comprising a tuned circuit having a resonant frequency which approximates the predetermined radio frequency at which the device is to be operated.

The device per se comprises a sealed light-transmitting globular-shaped envelope of predetermined dimensions, a discharge-sustaining medium is contained within the envelope and a layer comprising phosphor material is carried on the interior surface of the envelope. A core is operatively positioned in energy transferring relationship with respect to the envelope and the core principally comprises magnetic material of high permeability and having a looped configuration of predetermined dimensions and also having predetermined cross-sectional dimensions. A power winding having a predetermined number of turns is wrapped about the core. The power winding is connected to a pair of power input terminals for connection to the radio frequency power source and the power winding and core comprise a part of the tuned circuit output portion of the radio frequency power source. During operation of the device, the radio frequency energy passed through the power winding creates radio frequency electromagnetic fields through and about the core and within the envelope to excite the discharge sustaining medium to emit short wavelength radiations, and the phosphor layer is responsive to these short wavelength radiations to emit visible radiations which pass through the envelope. There is also provided an additional feed-back signal winding wrapped about the core and connecting to a pair of feed-back signal output terminals of the device.

The present improved high-efficiency radio-frequency Class E oscillator circuit is adapted to be connected to all of the device terminals for energizing the device and the oscillator circuit comprises input terminals adapted to be connected to a source of AC energizing potential and circuit output terminals which are adapted to be connected to the power input terminals of the device. A rectifier means connects across the circuit input terminals for rectifying the AC energy to provide across two DC output terminals thereof a DC potential of predetermined value. A transistor means, which is selected to have a short collector current fall time, provides the radio frequency oscillation and the transistor has base, collector, and emitter terminals. The base terminal of the transistor connects through a resistor of predetermined value to the more positive output terminal of the rectifier and to one of the circuit power output terminals. A load-network capacitor of predetermined value connects between the more positive output terminal of the rectifier and the collector terminal of the transistor, and a load-network inductor of predetermined value connects between the collector terminal of the transistor and the other of the circuit power output terminals. A tuned circuit capacitor of predetermined value is connected across the circuit power output terminals and with the power winding and device core, as connected thereacross, forms a tuned circuit having a resonant frequency which establishes the radio frequency at which the device is to be operated. The oscillator circuit also has a pair of feed-back signal input terminals which are adapted to be connected to the feed-back signal output terminals of the device. One of the circuit feed-back signal input terminals electrically connects to one of the DC output terminals of the rectifier, and the other of the circuit feed-back signal input terminals electrically connects to the base terminal of the transistor through a phase-controlling capacitor, so that when the device is connected to the oscillator, there is provided feed-back oscillatory energy for the transistor.

BRIEF DESCRIPTION OF THE DRAWINGS

For a better understanding of the invention, reference may be had to be preferred embodiment, exemplary of the invention, shown in the accompanying drawings, in which.

DESCRIPTION OF THE PREFERRED EMBODIMENTS

Figure 1:
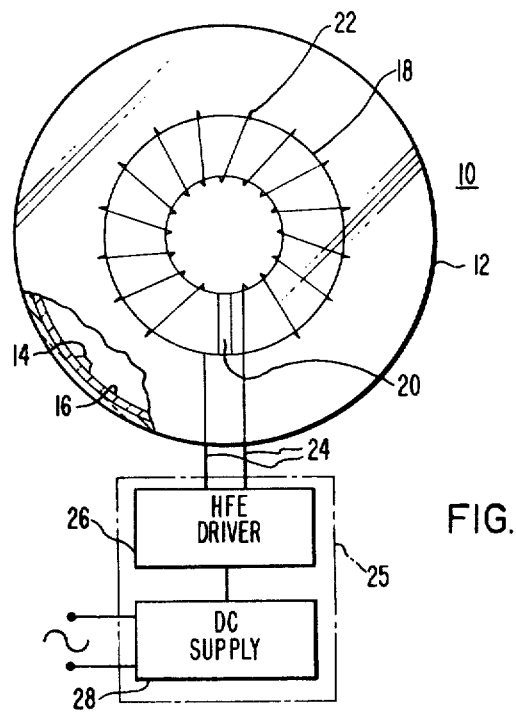
FIG. 1 is a diagrammatic view, shown partly in section, of the basic components comprising the present lamp.

Referring to the diagrammatic showing of FIG. 1, the device or lamp 10 generally comprises a sealed light-transmitting globular-shaped envelope 12 of predetermined dimensions and enclosing a discharge-sustaining medium such as a few torrs of argon and a small amount of mercury 14, similar to conventional fluorescent lamps. Carried on the internal surface of the envelope is a layer 16 comprising luminescent phosphor material. Included within the envelope is a core 18 which principally comprises magnetic material of high permeability and having a looped configuration of predetermined dimensions. As a specific example, the core has a toroidal configuration and in accordance with the improvement disclosed in the heretofore referenced copending application Ser. No. 883,544, filed Mar. 6, 1978, the core preferably includes a narrow gap 20 comprising low-permeability substance such as mica traversing the cross section of the core. A winding 22 having a predetermined number of turns is wrapped about the core and lead-in members 24 connect the winding to the radio frequency power source 25 which comprises an HF drive and oscillator section 26 together with an A.C. to D.C. power supply 28 designed to operate from a 115 volt A.C. 60 Hz line. In the operation of the lamp as shown in FIG. 1, when the lamp is energized, the radio frequency electromagnetic fields set up through and about the core and within the envelope excite the discharge-sustaining medium to emit short wavelength radiations which in turn excite the phosphor layer to emit visible radiations which pass through the envelope.

Figure 2A:
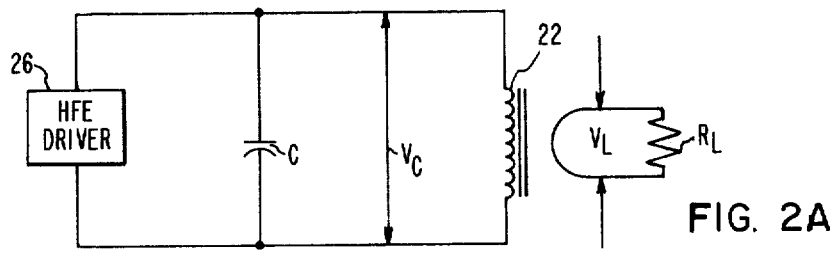
FIG. 2A is a simplified circuit diagram for the present HFE lamp, and the circuit shown in FIG. 2B is equivalent to that shown in FIG. 2A.
Figure 2B:
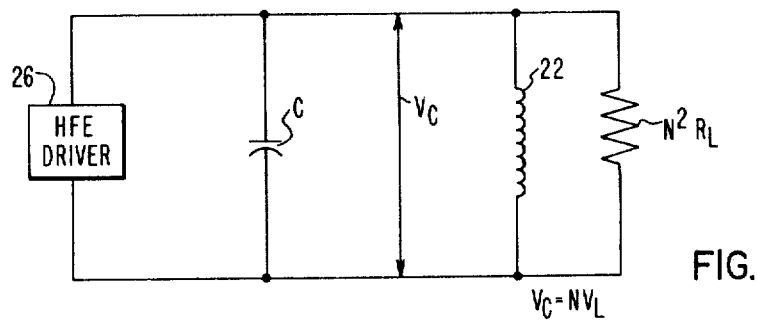

The ferrite core can be considered, electrically, as a transformer with "N" turns of winding 22 on its primary and one turn on its secondary, namely, the discharge, loaded by the equivalent lamp resistance $R_L$. FIG. 2A shows this equivalent circuit with the lamp voltage, $V_L$ also indicated and FIG. 2B shows a further simplification of this equivalent circuit. In operation, lamp load is reflected in the coil 22 as approximately $N^2R_L$ ohms and $V_C$ equals $NV_L$.

Figure 3:
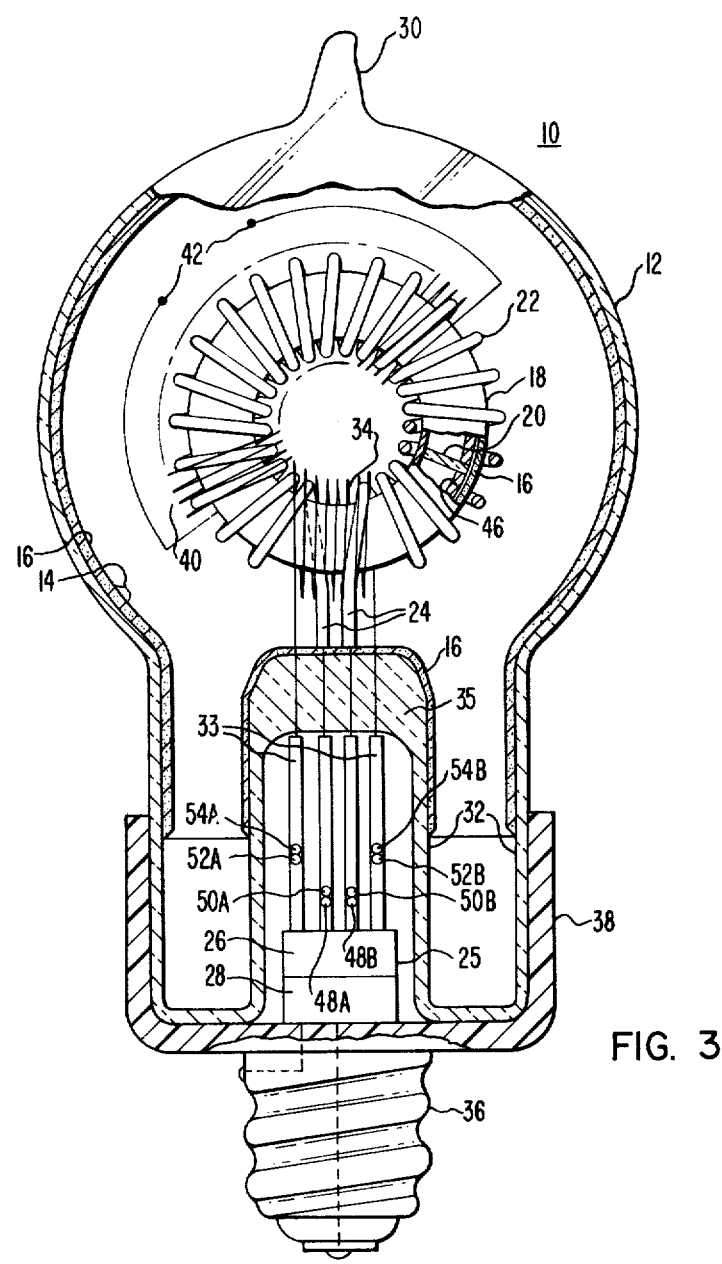
FIG. 3 is an elevational view, shown partly in section, of a practical embodiment of an HFE lamp.

Referring to FIG. 3, the practical lamp 10 comprises a sealed light-transmitting globular or pear-shaped envelope 12 of predetermined dimensions. As an example, the envelope 12 has a height of 6 inches and an outer diameter of 4 inches. The envelope 12 is evacuated via the tip 30 at the top thereof and is provided with a discharge-sustaining filling comprising 1.5 torrs of argon and a small charge of mercury 14. A layer comprising phosphor material 16 is carried on the interior surface of the envelope and as a specific example, any of the standard halophosphates can be used. Alternatively, for better temperature-dependence characteristics, a three component blend of rare-earth activated phosphors can be used and such as phosphor mixture is disclosed in U.S. Pat. No. 3,937,998, dated Feb. 10, 1976 to Verstegen et al.

A core 18, such as previously described, is operatively positioned within the envelope 12 and the core principally comprises magnetic material of high permeability and having a looped configuration of predetermined dimensions and cross sectional area, such as previously described in detail. Preferably the core has a toroidal configuration for convenience of manufacturing, but this configuration can be varied considerably. Preferably, the core also includes a narrow gap 20 which traverses the cross section of the core and a power winding 22 of twenty-two turns is wrapped about the core 18. As a specific example, the toroidal core has an outer diameter of 6.096 cm, an inner diameter of 3.556 cm, and a thickness of 1.27 cm. The mica gap 20, if included, has a thickness of 0.015 cm.

The preferred principal material comprising the core 18 is ferrite, although other magnetic materials can be substituted therefor. As is well known, and using a dictionary definition, ferrite is any of several compounds formed usually by treating hydrated ferric oxide with an alkali or by heating ferric oxide with a metallic oxide and regarded in some cases as spinels such as $NaFeO_2$ or $ZnFe_2O_4$. The ferrite core specifically considered hereinbefore is marketed as the 8000 Series by Indiana General, a Division of Electronic Memories & Magnetics Corp., Keasbey, NJ and is commercially available in a form which is not provided with the gap as described hereinbefore. Such ferrites are normally prepared with a sintering technique. As sintered in a toroidal form, the ferrite has a high permeability such as 5,000 and a low electrical resistivity such as 100 ohm-cm. With the gap 20, as described, the effective permeability decreases to 806.8.

Power lead-in members 24 connect the winding 22 to the radio frequency power source 25 comprising the combined driver 26 and A.C. to D.C. power supply 28 (shown in block form) and positioned within the elongated neck portion 32 of the lamp 10. As previously described, the core 18 comprises a part of the tuned circuit output portion for the radio frequency power source.

Feed-back signal lead members 33 connect a feed-back winding 34, carried on the core 18, to the radio frequency power source, as described in detail hereinafter. As a specific example, the feed-back winding 34 has twenty-two turns.

Other details of the lamp 10 are of generally conventional construction and the four leads 24 and 33 to the coil 18 are sealed through a stem 35 to connect to the power source 25 within the elongated stem and neck, which in turn connects to a conventional screw type base 36 which is affixed to the lamp neck by means of a base adaptor member 38 formed of suitable plastic such as phenolic resin. Preferably, the phosphor material is also coated over the core 18 for most efficient utilization of the 254 nm radiations generated by the low-pressure mercury discharge.

The operation of the lamp 10 is initiated by means of an additional winding 40 comprising a relatively large number of turns carried on the core 18 and the winding 40 terminates in end portions 42 spaced apart a predetermined distance within the envelope 12. In the operation of the device, when the turned circuit is initially energized, the additional winding 40 has generated between the spaced end portions 42 a relatively high voltage and the capacitive coupling therebetween ionizes the discharge-sustaining medium within the envelope 12 to initiate the operation of the device. Once the device is operating, the winding 40 in effect is out of the circuit. As a specific example, the winding 40 comprises eighty-eight turns and the end portions 42 are spaced apart by more than one centimeter, and example being two cm.

It is desirable to insulate the winding 22 from the ferrite core and this is readily accomplished by providing the core with a layer 46 of a refractory-type inorganic cement such as that marketed by Sauereisen Cement Co., Pittsburgh, PA, and sold under the trademark "Sauereisen Cement", which is a zirconia-based cement. A typical thickness for the layer 46 is 0.05 to 0.1 mm. Other materials which can be used to coat the ferrite core to insulate the same from the winding are a devitrifying glass such as that marketed by Corning Glass Co. under the trademark "Pyroceram". Alternatively, the winding 22 can be provided with a layer of glass or fiberglass insulation thereabout.

To complete the description, the power source 25 has power output terminals 48A and 48B which are connected to the power input terminals 50A and 50B of the device 10 for connection to the power winding 22 of the device 10. In addition, the power source 25 has feed-back signal input terminals 52A and 52B which are connected to feed-back signal output terminals 54A and 54B on the device 10 for connection to the feed-back winding 34 carried on the core 18.

In the lamp embodiment as described in copending application Ser. No. 883,544, filed Mar. 6, 1978, the oscillator circuits were described as operating in Class A, B or C mode, with B and C preferred. The A, B and C suffix indicates the angle of flow of current through the output driver with Class A having a 360° angle of flow, Class B 180° and Class C less than 180°. Classes B and C are normally preferred modes for obtaining maximum efficiency consistent with power output. Class B or C operation is subject to variability due to changes in the transistor driver parameters and changes or differences of these parameters from one circuit to another can result in variations of D.C. current and power output. Also, variations that occur during the life of the transistor can result in these changes. Two other circuits are potentially viable and these are so-called Class D and Class E circuits which are potentially more efficient than the Class B or C types and have good power output capability. Since these circuits operate in a switching mode action, they are less subject to changes in the transistor drive parameters and are thus more readily reproducible. While the performance of Class D circuits is good, they require more components than a Class E circuit and also require two center tapped transformers. Since compactness of circuit design is an objective for the present type lamps, Class E circuits are much preferred.

Comparing the maximum efficiencies obtainable for Class B, C and E circuits, at 100 kHz operation, a Class B circuit can operate at about 78.5% efficiency, a Class C circuit with 120° angle of flow can operate at a maximum efficiency of 87% and a Class E circuit with a switching time for the transistor of 0.4 microsecond can operate with a maximum circuit efficiency of about 98% wherein efficiency is defined as A.C. power out times 100% divided by D.C. power in.

Figure 4:
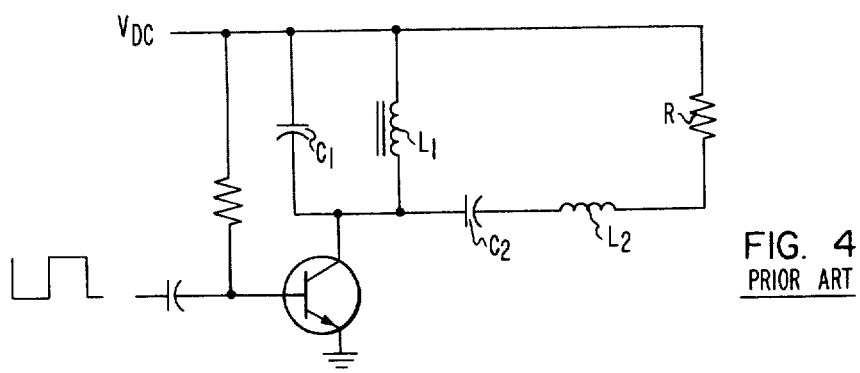
FIG. 4 is a circuit diagram of a typical Class E driver of the prior art.

FIG. 4 shows a basic Class E type circuit of the prior art. C1 and C2 are load network capacitors, L2 is a load network inductor and L1 is required to pass the D.C. power to the switching transistor. Base drive to the transistor is in the form of square waves. In designing such circuits, the following equations are used:

$$R = \frac{0.5768 (V_{DC} - V_{SAT})^2}{W_L} \, \Omega \tag{I}$$

wherein
$W_L$ = power into load R,
$V_{SAT}$ = saturation voltage of transistor
Typically, for this application,
$V_{DC}$ = 160 V, $V_{SAT}$ = 2 V, f = 100 kHz, R = 360 Ω

$$L_2 = \frac{Q_{L2} R \times 10^6}{2\pi f} \, \mu H \tag{II}$$

$$C_1 = \frac{[1 + 0.81 \, Q_{L2}/(Q_{L2}^2 + 4)] \times 10^6}{2\pi f R \times 5.447} \, \mu f \tag{III}$$

$$C_2 = \frac{[1 + 1.11/(Q_{L2} - 1.7879)] \times 10^6}{(2\pi f)^2 L_2} \, \mu f \tag{IV}$$

$$\eta = 1 + 0.67(\pi A)^2 - \frac{V_{SAT}}{V_{DC}} [1 + A - 0.67(\pi A)^2] \times 100 \tag{V}$$

$$A = (1 + 0.82/Q_{L2}) t_f f \tag{VI}$$

wherein $t_f$ = collector current fall time, e.g. 0.4 μs

It will be seen for the aforegoing equation (IV) that as $Q_{L2}$ approaches 1.7879, the value of $C_2$ starts to become very large and this is normally avoided. However, if $Q_{L2}$ is approximately 1.79, or about 1.8, $C_2$ in effect becomes infinite and can be replaced by a short circuit for A.C. purposes.

Figure 5:
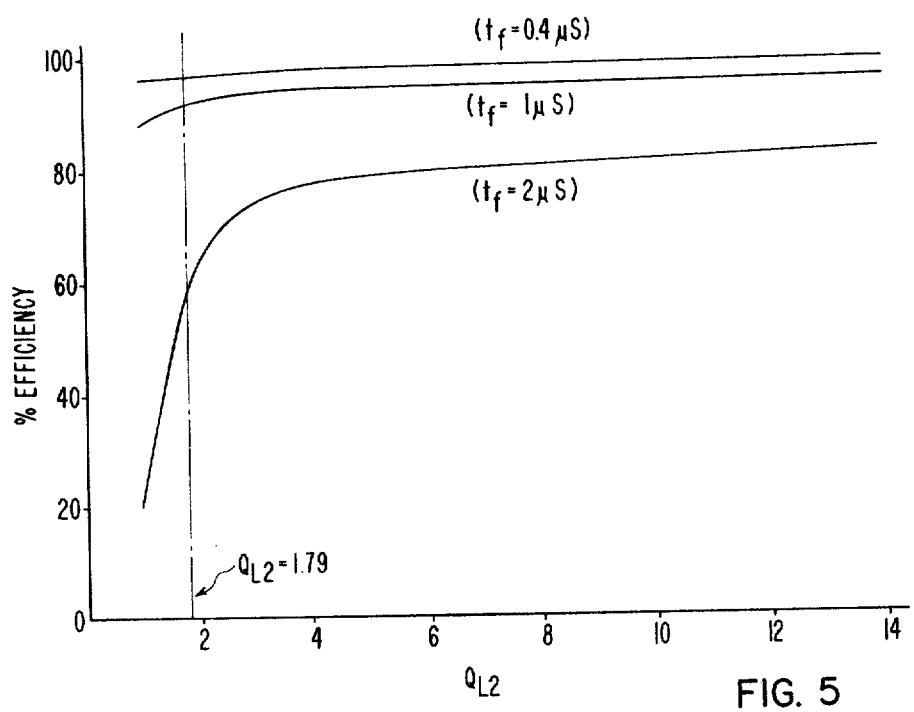
FIG. 5 is a graph of efficiency versus $Q_{L2}$ showing the effect of transistor switch-off time on efficiency in the present circuit.

The efficiency of operation of the Class E oscillator is also a function of $Q_{L2}$, as indicated by equations (V) and (VI), in which $t_f$ is the collector current fall time. If the value of $t_f$ is made small enough, however, relative to the operating frequency period, making $Q_{L2}$ about equal to 1.79 has an overall negligible effect on circuit efficiency, and this is indicated in FIG. 5 in which the circuit operating frequency is assumed to be 100 kHz. Thus, as shown in FIG. 5, if $t_f$=0.4 microsecond, the efficiency of the circuit at $Q_{L2}$=1.79 is about 97%, which is just about 1% below the maximum efficiency obtainable for this value of $t_f$. Substantially higher values of $t_f$ for this value of $Q_{L2}$, however, substantially impair the circuit efficiency, as shown in FIG. 5. For this reason, the transistor used with the circuit is so selected that the collector current fall time is relatively short. As a matter of practicality, the collector current fall time should be shorter than about one microsecond and preferably less than about 0.5 microsecond.

Figure 6:
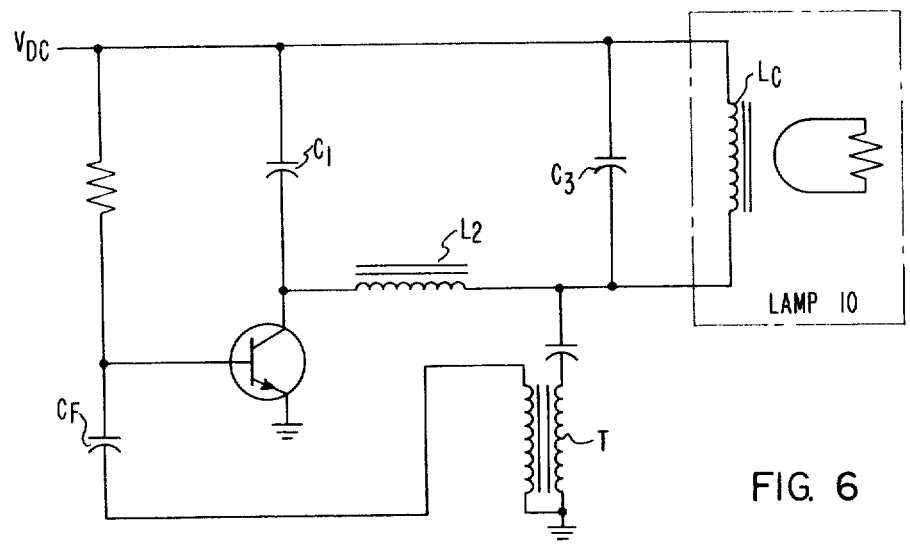
FIG. 6 is a circuit diagram of a modified Class E oscillator wherein a load-network capacitor and an inductor of the prior art circuit are eliminated by proper choice of circuit components.

With the foregoing circuit design parameters, $C_2$ can be removed from the circuit and this provides a path for the D.C. supply through the load R and load network inductor $L_2$, which in turn permits $L_1$, as shown in FIG. 4, to be removed from the circuit since it is no longer required to pass D.C. to the transistor. In addition, reduction of $Q_{L2}$ to a value as indicated also reduces the value of $L_2$ so that the circuit can be further compacted. In addition, the circuit can be made self-oscillatory by feed-back of the output voltage, in suitable phase, to the base input of the transistor and such a modified circuit is shown in FIG. 6 wherein a transformer T provides the feed-back signal to the base of the transistor through a phase-controlling capacitor $C_f$.

Figure 7:
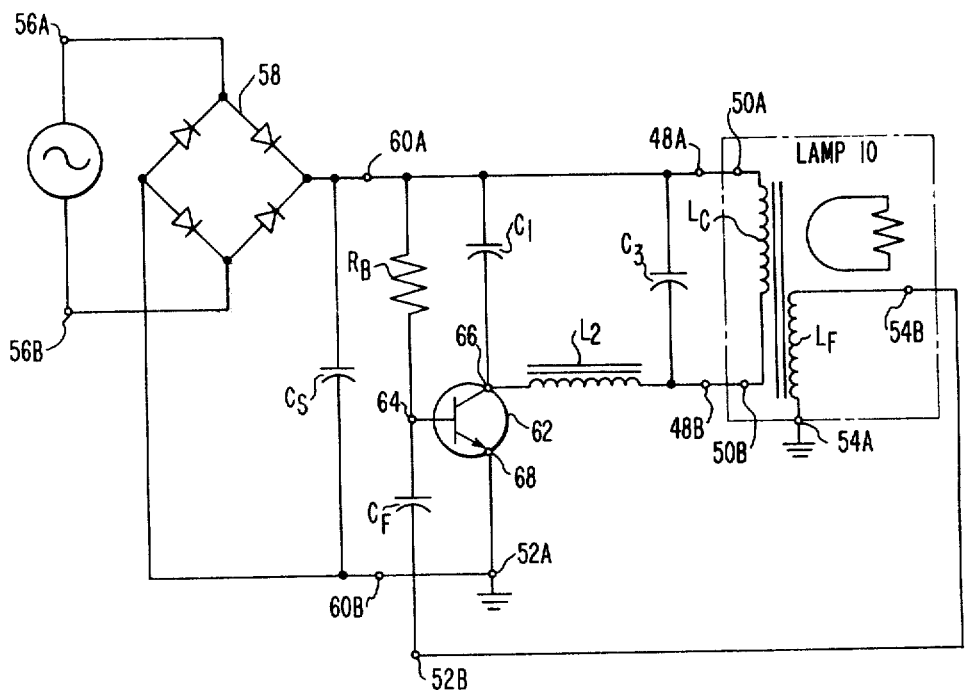
FIG. 7 is a circuit diagram of a lamp-Class E oscillator combination as is incorporated in a practical device of the present invention.

The final circuit design is shown in FIG. 7 and comprises circuit input terminals 56A and 56B which are adapted to be connected to a source of A.C. energizing potential, such as 115 VAC, 60 Hz, and circuit power output terminals 48A and 48B adapted for connection to the power input terminals 50A and 50B of the device 10. Of course, when the oscillator circuit is built into the base of the lamp, these connections are permanent.

A rectifier means 58 is connected across the circuit input terminals 56A and 56B for rectifying the A.C. energy to provide across first and second D.C. output terminals, respectively 60A and 60B, a D.C. potential of predetermined value, such as 160 V. For the embodiment as shown, the full wave diode rectifier 58 incorporates a bridge rectifier type VE48 (Varo Semiconductor, Inc.) and the value of the filter capacitor $C_s$ is 47 microfarads.

A transistor means 62 provides a radio frequency oscillation and has a base terminal 64, a collector terminal 66 and an emitter terminal 68 and as an example, this transistor is a type MJE 13003 (Motorola) having a collector current fall time of approximately 0.4 microsecond. In the circuit embodiment as shown, the base terminal 64 of transistor 62 connects through a resistor $R_B$ of predetermined value to the first, more positive output terminal 60A of the rectifier 58 and also to power output terminal 48A. The purpose of the resistor $R_B$ is to ensure that the transistor will turn on and as a specific example, it has a value of 47 Kohms. A load network capacitor $C_1$ having predetermined reactance connects between the first, more positive output terminal 60A and the rectifier and the collector terminal 66 of the transistor 62 and as a specific example, this capacitor $C_1$ has a capacitance of 1000 picofarads. A load-network inductor $L_2$ connects between the collector terminal 66 of the transistor 62 and the other circuit power output terminal 48B. As a specific example, the inductance of $L_2$ is 1000 micro Henries.

A tuned circuit capacitor means $C_3$ of predetermined capacitance connects across the circuit power output terminals 48A and 48B and with the wound core 18 of the device 10, as connected thereacross, forms a tuned circuit having a resonant frequency which establishes the radio frequency at which the device 10 is to be operated. For the device parameters as provided hereinbefore, the value of $C_3$ is 4000 picofarads and the resonant frequency of the resulting tank circuit is 100 kHz.

The circuit in FIG. 7 also has a pair of feed-back signal input terminals 52A and 52B which are electrically connected to the feed-back signal output terminals 54A and 54B of the device. One of the feed-back signal input terminals 52A electrically connects to one of the DC output terminals 60B of the rectifier 58 and the other of the circuit feed-back input terminals 52B electrically connects to the base terminal 64 of transistor 62 through a phase-controlling capacitor $C_f$ so that when the device 10 is connected to the oscillator circuit as shown in FIG. 7, there is provided feed-back oscillatory energy for the transistor 62. As a specific example, the phase controlling capacitor $C_f$ has a capacitance of 1000 picofarads.

The circuit can be modified somewhat. For example, in the embodiment as shown electrical connection between terminal 52A and terminal 54A is made through chassis ground. The terminal 54A can be connected to the more positive side of the power supply at terminal 60A if desired. With such a construction, only three lead-in conductors would be required for the lamp since one of the conductors would be common to both the power input and the feed-back output from the lamp or device 10. With the foregoing values of circuit elements, $Q_{L2}$ is designed for a value of approximately 1.79.

Figure 8:
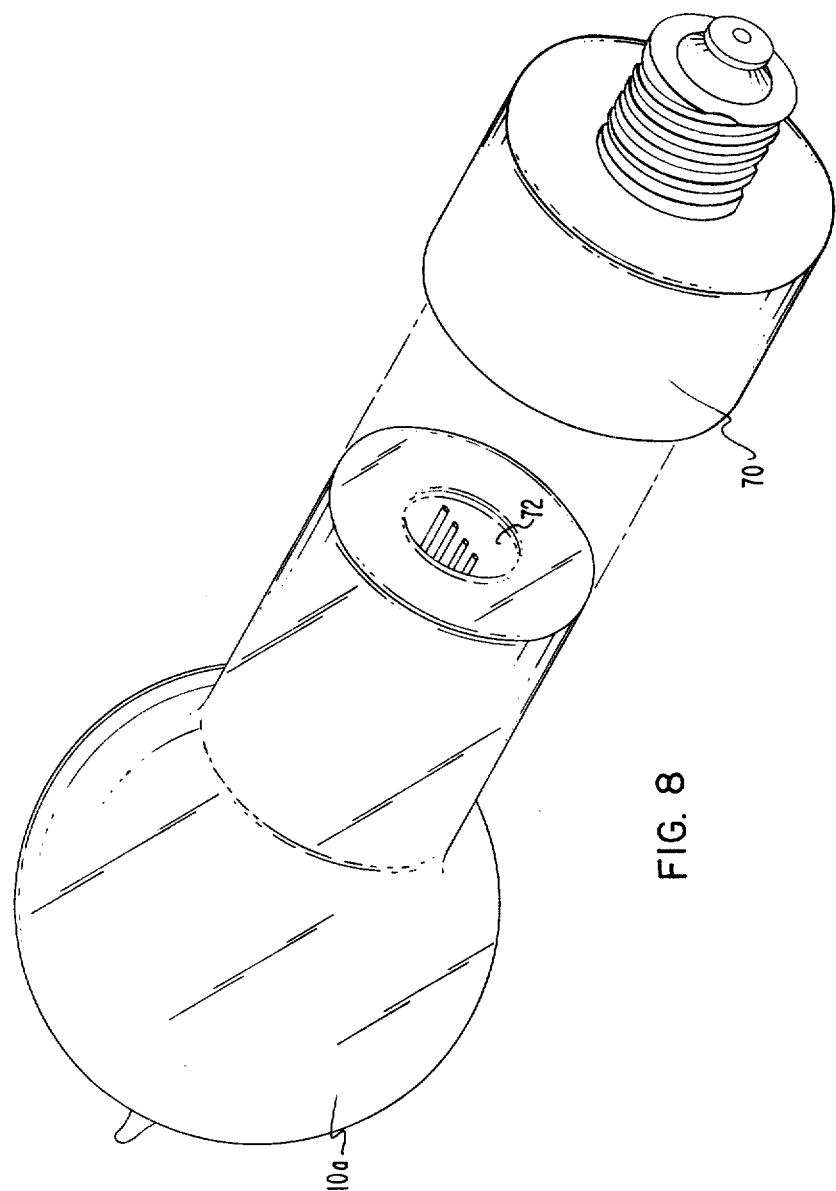
FIG. 8 is an isometric view of an alternative embodiment wherein the oscillator circuit is contained in a base member which is separable from the device per se.

Various other lamp embodiments are possible. For example, it may be desirable to design the circuit in such fashion that it will out-last several of the devices and in such case, the device 10A can be made separable from the oscillator circuit by the expedient of a plug-in type adaptor mechanism, as shown in FIG. 8. In this embodiment, the oscillator circuit is contained within the base and neck portion 70 and the device 10A is connectable thereto by means of a plug-in adaptor 72. In other respects, the device and circuit are the same as described hereinbefore.

In all device embodiments of the present invention, the core 18 is operatively positioned in energy transferring relationship with respect to the envelope 12. In the preferred embodiment as shown diagrammatically in FIG. 1 and as shown in detail in FIG. 3, the core 18 is totally enclosed by the sealed envelope 12. As an alternative embodiment, the core can be only partially enclosed within the sealed envelope and such an embodiment is disclosed in U.S. Pat. No. 3,987,335 and also in the aforementioned copending application Ser. No. 883,544, filed Mar. 6, 1978. Alternatively, the core can also be positioned in energy transferring relationship with respect to the envelope through the use of an envelope re-entrant portion in which the core is positioned, and such a construction is shown in U.S. Pat. No. 4,005,330 dated Jan. 25, 1977.

While mercury is the preferred discharge-sustaining substance, other known substance, such as cadmium, can be substituted therefor.

I claim:

1. In combination with an electrodeless discharge device designed to operate with a rated power consumption when energized with predetermined radio frequency energy as generated by a radio-frequency power source, said radio-frequency power source having an output portion comprising a tuned circuit having a resonant frequency which approximates said predetermined radio frequency at which said device is to be operated, said device comprising:

a sealed light-transmitting globular-shaped envelope of predetermined dimensions, a discharge-sustaining medium within said envelope, and a layer comprising phosphor material carried on the interior surface of said envelope;

a core operatively positioned in energy transferring relationship with respect to said envelope, said core principally comprising magnetic material of high permeability and having a looped configuration of predetermined dimensions and also having predetermined cross-sectional dimensions, and a power winding having a predetermined number of turns wrapped about said core;

a pair of power input terminals connecting to said power winding for connection to said radio-frequency power source, said power winding and core comprising a part of said tuned circuit output portion of said radio-frequency power source, and during operation of said device, the radio-frequency energy passed through said power winding creates radio-frequency electromagnetic fields through and about said core and within said envelope to excite said discharge-sustaining medium to emit short wavelength radiations, and said layer comprising phosphor is responsive to said short wavelength radiations to emit visible radiations which pass through said envelope; and an additional feed-back signal winding having a predetermined number of turns wrapped about said core and connecting to a pair of feed-back signal output terminals of said device, the improved radio-frequency Class E oscillator circuit which is adapted to be connected to all of said device terminals for energizing said device, said oscillator circuit comprising:

(a) circuit input terminals adapted to be connected to a source of A.C. energizing potential, and circuit power output terminals adapted to be connected to said power input terminals of said device for connection to said device power winding;

(b) rectifier means connecting across said circuit input terminals for rectifying the A.C. energy to provide across first and second D.C. output terminals thereof a D.C. potential of predetermined value, said first D.C. output terminal being positive with respect to said second D.C. output terminal;

(c) transistor means for providing radio-frequency oscillations and having base, collector and emitter terminals, the base terminals of said transistor means connecting through a resistor of predetermined value to said first D.C. output terminal of said rectifier means and to one of said power output terminals, load-network capacitor means of predetermined value connecting between said first D.C. output terminal of said rectifier means and the collector terminal of said transistor means, load-network inductor means of predetermined value connecting between the collector terminal of said transistor means and the other of said circuit power output terminals, said transistor means having a short collector current fall time; and, (d) tuned circuit capacitor means of predetermined value connected across said circuit power output terminals and forming with said device winding and said device core, as connected thereacross, a tuned circuit having a resonant frequency which establishes the radio frequency at which said device is to be operated; and (e) said oscillator circuit also having a pair of feedback signal input terminals which are adapted to be connected to said feed-back signal output terminals of said device, one of said circuit feed-back signal input terminals electrically connects to one of said first and said second DC output terminals of said rectifier means, and the other of said circuit feedback signal input terminals electrically connects to the base terminal of said transistor means through a phase-controlling capacitor so that when said device is connected to said oscillator circuit, there is provided feed-back oscillatory energy for said transistor means.

2. The combination as specified in claim 1, wherein said core in said device also includes narrow gap means comprising low-permeability substance traversing the cross section of said core.

3. The combination as specified in claim 1, wherein said device and said energizing oscillator circuit therefor are formed as a unitary combination designed to be replaced as a unit.

4. The combination as specified in claim 1, wherein said device and said energizing oscillator circuit therefor as formed as separable units designed to be separately replaced if required.

5. The combination as specified in claim 1, wherein the design parameters of said device and said oscillator circuit are such that the reactance of said load-network inductor means multiplied by two Pi times said resonant frequency divided by the resistive load of said device is approximately 1.8, and said transistor means has a collector current fall time less than about 1 microsecond.

6. The combination as specified in claim 5, wherein said transistor has a collector current fall time of less than about 0.5 microsecond, and the reactance of said load-network inductor means multiplied by two Pi times said resonant frequency divided by the resistive load of said device is approximately 1.79.

7. The combination as specified in claim 5, wherein the elements comprising said oscillator are contained within a conducting chassis, said second D.C. output terminal of said rectifier means electrically connects to said chassis, and said one of said circuit feed-back signal input terminals also electrically connects to said chassis.

* * * * *